United States Patent
Chang

(10) Patent No.: US 9,507,702 B2
(45) Date of Patent: Nov. 29, 2016

(54) METHOD OF PERFORMING WRITE ACCESS BY DISTRIBUTING CONTROL RIGHTS TO THREADS, MEMORY CONTROLLER AND FLASH MEMORY STORAGE DEVICE USING THE SAME

(75) Inventor: Ching-Wen Chang, Hsinchu (TW)

(73) Assignee: PHISON ELECTRONICS CORP., Miaoli (TW)

( * ) Notice: Subject to any disclaimer, the term of this patent is extended or adjusted under 35 U.S.C. 154(b) by 950 days.

(21) Appl. No.: 12/728,446

(22) Filed: Mar. 22, 2010

(65) Prior Publication Data

US 2011/0191524 A1 Aug. 4, 2011

(30) Foreign Application Priority Data

Feb. 4, 2010 (TW) ................................ 99103360 A

(51) Int. Cl.

| G06F 12/00 | (2006.01) |
|---|---|
| G06F 13/00 | (2006.01) |
| G06F 13/28 | (2006.01) |
| G06F 12/02 | (2006.01) |
| G06F 13/18 | (2006.01) |
| G06F 9/48 | (2006.01) |
| G06F 9/52 | (2006.01) |
| G06F 9/46 | (2006.01) |

(52) U.S. Cl.
CPC ............... *G06F 12/02* (2013.01); *G06F 9/485* (2013.01); *G06F 9/4843* (2013.01); *G06F 13/18* (2013.01); *G06F 9/461* (2013.01); *G06F 9/48* (2013.01); *G06F 9/4806* (2013.01); *G06F 9/4881* (2013.01); *G06F 9/52* (2013.01); *G06F 9/526* (2013.01); *G06F 12/0246* (2013.01)

(58) Field of Classification Search
None
See application file for complete search history.

(56) References Cited

U.S. PATENT DOCUMENTS

| 6,782,440 | B2 * | 8/2004 | Miller ........................... 710/200 |
| 7,234,139 | B1 * | 6/2007 | Feinberg ............ G06F 9/45504 718/1 |
| 8,863,135 | B2 * | 10/2014 | Wilianto et al. .............. 718/103 |
| 2005/0050283 | A1 * | 3/2005 | Miller et al. ................... 711/150 |
| 2007/0045425 | A1 * | 3/2007 | Yoshida et al. ............... 235/492 |
| 2010/0037228 | A1 * | 2/2010 | Wilianto et al. ............. 718/103 |
| 2011/0191526 | A1 * | 8/2011 | Haukness et al. ............ 711/103 |

* cited by examiner

*Primary Examiner* — Jared Rutz
*Assistant Examiner* — Marwan Ayash
(74) *Attorney, Agent, or Firm* — J.C. Patents

(57) ABSTRACT

A flash memory storage device, a controller thereof, and a programming management method thereof are provide for the flash memory storage device including a flash memory chip, wherein at least a first thread and a second thread are to be implemented within the flash memory storage device. The method includes defining a predetermined programming unit and receiving a first write command sent by a host. The method also includes distributing a control right of the flash memory chip to the first thread if the first write command is determined to be executed by the first thread, and controlling the first thread to release the control right of the flash memory chip after the first thread finishes a programming operation of the predetermined programming unit.

15 Claims, 9 Drawing Sheets

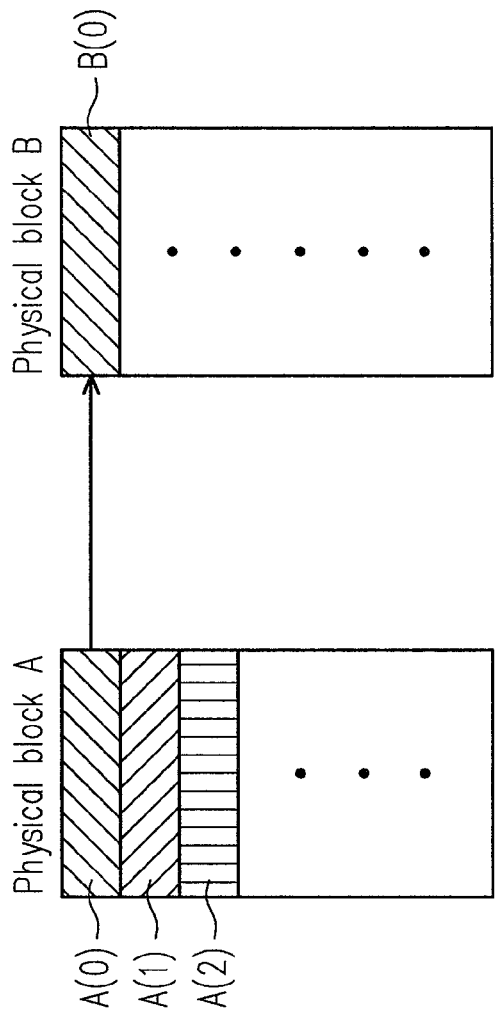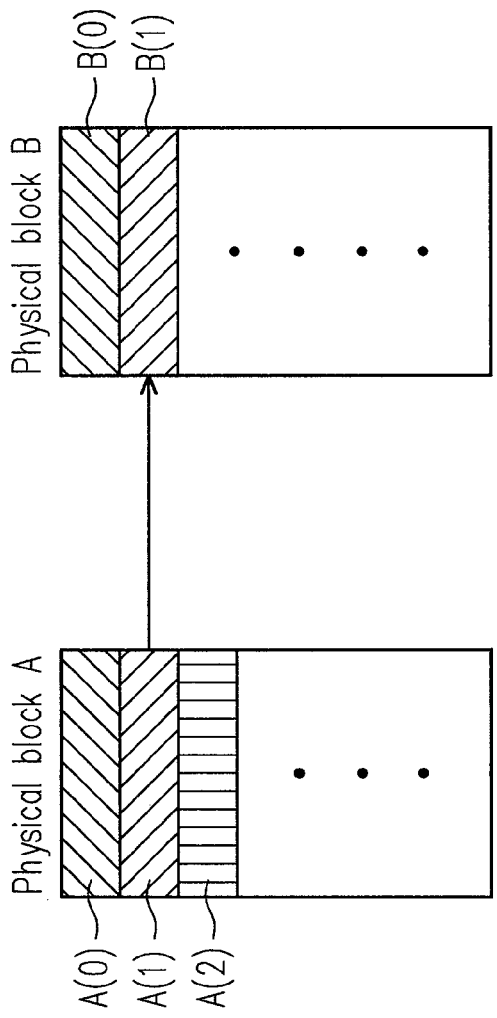
FIG. 4A
FIG. 4B

METHOD OF PERFORMING WRITE ACCESS BY DISTRIBUTING CONTROL RIGHTS TO THREADS, MEMORY CONTROLLER AND FLASH MEMORY STORAGE DEVICE USING THE SAME

CROSS-REFERENCE TO RELATED APPLICATION

This application claims the priority benefit of Taiwan application serial no. 99103360, filed on Feb. 4, 2010. The entirety of the above-mentioned patent application is hereby incorporated by reference herein and made a part of this specification.

BACKGROUND OF THE INVENTION

1. Field of the Invention

The present invention relates to an application of a flash memory. More particularly, the present invention relates to a program management method of a flash memory, and a flash memory controller and a flash memory storage device using the same.

2. Description of Related Art

Generally, a flash memory chip in a flash memory storage device can be divided into a plurality of physical blocks, and each of the physical blocks can be divided into a plurality of physical pages. Wherein, the physical block is a minimum erase unit of the flash memory, and the physical page is a minimum program unit of the flash memory.

Since during a program operation of a memory cell of the flash memory, a value of the memory cell can only be programmed from 1 to 0, data cannot be directly written into the programmed physical pages. In other words, the page stored with data has to be first erased, and then the page can be re-programmed. However, since the erase operation of the flash memory is performed while taking the physical block as an erase unit, during the erase operation of the physical page stored with old data, the whole physical block where the physical page is belonged to have to be erased.

Due to characteristics that the physical page of the flash memory serves as the program unit, and the physical block serves as the erase unit, the physical blocks in the flash memory chip are approximately divided into a data area and a spare area. Wherein, the physical blocks of the data area are physical blocks that have been used to store data, and the physical blocks of the spare area are unused physical blocks. When a host is about to program data into the flash memory storage device, a control circuit of the flash memory storage device extracts a physical block from the spare area to program the data, and logically associates the extracted physical block to the data area. Moreover, after the physical block of the data area is erased, the erased physical block is logically associated to the spare area.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY OF THE INVENTION

The present invention is directed to a program management method of a flash memory, which can ensure completing a write command within a predetermined time limit.

The present invention is directed to a flash memory storage device, which can execute the aforementioned program management method of a flash memory to ensure completing a write command within a predetermined time limit.

The present invention is directed to a flash memory controller, which can execute the aforementioned program management method of a flash memory to ensure completing a write command within a predetermined time limit.

The present invention provides a program management method of a flash memory, which is adapted to a flash memory storage device including a flash memory chip, and at least a first thread and a second thread are to be implemented within the flash memory storage device. The method can be described as follows. A predetermined program unit is defined, and a first write command is received. When the first write command is determined to be executed by the first thread, a control right of the flash memory chip is distributed to the first thread. The first thread is controlled to release the control right of the flash memory chip after the first thread completes a program operation of the predetermined program unit.

In an embodiment of the present invention, after the step of distributing the control right of the flash memory chip to the first thread, the method further includes distributing the control right of the flash memory chip to the second thread after the first thread releases the control right of the flash memory chip if a second write command required to be executed by the second thread is received during a period that the first thread executes the program operation of the predetermined program unit, and controlling the second thread to release the control right of the flash memory chip after the second thread programs a second program data corresponding to the second write command into the flash memory chip.

In an embodiment of the present invention, after the step of controlling the second thread to release the control right of the flash memory chip, the method further includes determining whether the first thread has completed a program operation of a first program data corresponding to the first write command, and distributing the control right of the flash memory chip to the first thread if the first thread does not complete the program operation of the first program data corresponding to the first write command, and controlling the first thread to release the control right of the flash memory chip after the first thread completes the program operation of the predetermined program unit.

In an embodiment of the present invention, after the step of distributing the control right of the flash memory chip to the first thread, the method further includes determining whether the first thread has completed a program operation of a first program data corresponding to the first write command after the first thread releases the control right of the flash memory chip if none other write command is received during a period that the first thread executes the program operation of the predetermined program unit, and distributing the control right of the flash memory chip to the first thread if the first thread does not complete the program operation of the first program data corresponding to the first write command, and controlling the first thread to release the control right of the flash memory chip after the first thread completes the program operation of the predetermined program unit.

In an embodiment of the present invention, the first thread is used for executing a smart card application program. The method further includes determining that the first write command is required to be executed by the first thread if the first write command is an application protocol data unit (APUD) command.

In an embodiment of the present invention, the second thread is used for executing a secure digital (SD) card read/write application program.

In an embodiment of the present invention, a number of physical pages included in the predetermined program unit are less than a number of physical pages included in a physical block of the flash memory chip.

The present invention provides a flash memory storage device, wherein at least a first thread and a second thread are to be implemented within the flash memory storage device. The flash memory storage device includes a flash memory chip, a connector and a flash memory controller. The connector is coupled to a host for transmitting write commands sent by the host. The flash memory controller is coupled to the flash memory chip and the connector, and is used for defining a predetermined program unit. Wherein, after the flash memory controller receives a first write command sent by the host, the flash memory controller distributes a control right of the flash memory chip to the first thread when determining that the first write command is required to be executed by the first thread, and controls the first thread to release the control right of the flash memory chip after the first thread completes a program operation of the predetermined program unit.

In an embodiment of the present invention, if the flash memory controller receives a second write command from the host that is required to be executed by the second thread during a period that the first thread executes the program operation of the predetermined program unit, the flash memory controller distributes the control right of the flash memory chip to the second thread after the first thread releases the control right of the flash memory chip, and controls the second thread to release the control right of the flash memory chip after the second thread programs a second program data corresponding to the second write command into the flash memory chip.

In an embodiment of the present invention, after the second thread is controlled to release the control right of the flash memory chip, the flash memory controller distributes the control right of the flash memory chip to the first thread when determining that the first thread does not complete a program operation of a first program data corresponding to the first write command, and controls the first thread to release the control right of the flash memory chip after the first thread completes the program operation of the predetermined program unit.

In an embodiment of the present invention, after the control right of the flash memory chip is distributed to the first thread, if the connector does not receive another write command sent by the host during a period that the first thread executes the program operation of the predetermined program unit, the flash memory controller determines whether the first thread has completed a program operation of a first program data corresponding to the first write command after the first thread releases the control right of the flash memory chip. If the first thread does not complete the program operation of the first program data, the flash memory controller distributes the control right of the flash memory chip to the first thread and controls the first thread to release the control right of the flash memory chip after the first thread completes the program operation of the predetermined program unit.

In an embodiment of the present invention, the first thread is used for executing a smart card application program, and the flash memory controller determines that the first write command is required to be executed by the first thread if the first write command is an application protocol data unit (APUD) command.

In an embodiment of the present invention, the second thread is used for executing a secure digital (SD) card read/write application program.

In an embodiment of the present invention, a number of physical pages included in the predetermined program unit are less than a number of physical pages included in a physical block of the flash memory chip.

The present invention provides a flash memory controller disposed in a flash memory storage device coupled to a host. The flash memory storage device includes a flash memory chip, and at least a first thread and a second thread are to be implemented within the flash memory storage device. The flash memory controller includes a microprocessor unit, a flash memory interface unit, a host interface unit and a resource distributing unit. The flash memory interface unit is coupled to the microprocessor unit, and is used for coupling to the flash memory chip. The host interface unit is coupled to the microprocessor unit, and is used for coupling to the host. The resource distributing unit is coupled to the microprocessor unit, and is used for defining a predetermined program unit. The host interface unit receives a first write command sent by the host. The resource distributing unit distributes a control right of the flash memory chip to the first thread when determining that the first write command is required to be executed by the first thread, and controls the first thread to release the control right of the flash memory chip after the first thread completes a program operation of the predetermined program unit.

According to the above descriptions, regarding the flash memory storage device simultaneously having two threads of the smart card application program and the SD card read/write application program, the program operation of the flash memory chip executed by the smart card application program can be interrupted by the SD card read/write application program. In this way, the SD card read/write application program can execute the write command sent by the host within a completion time of a write command defined by an SD card specification.

In order to make the aforementioned and other features and advantages of the present invention comprehensible, several exemplary embodiments accompanied with figures are described in detail below.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 4A, 4B and 4C are schematic diagrams illustrating merging of physical blocks according to an exemplary embodiment of the present invention.

DESCRIPTION OF THE EMBODIMENTS

Figure 1A:
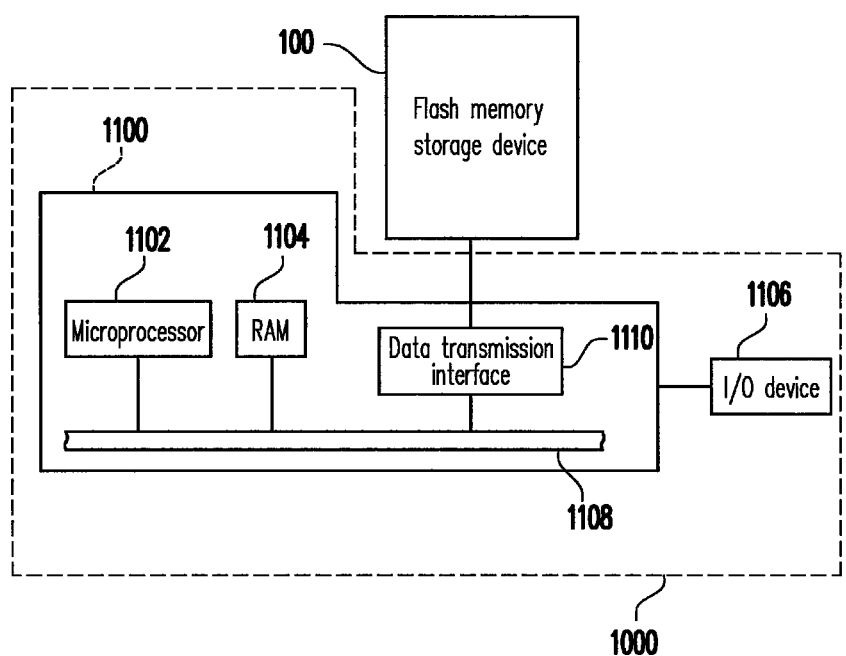
FIG. 1A is a schematic diagram illustrating a host system using a flash memory storage device according to an exemplary embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A,B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

FIG. 1A is a schematic diagram illustrating a host system using a flash memory storage device according to an exemplary embodiment of the present invention.

Figure 1B:
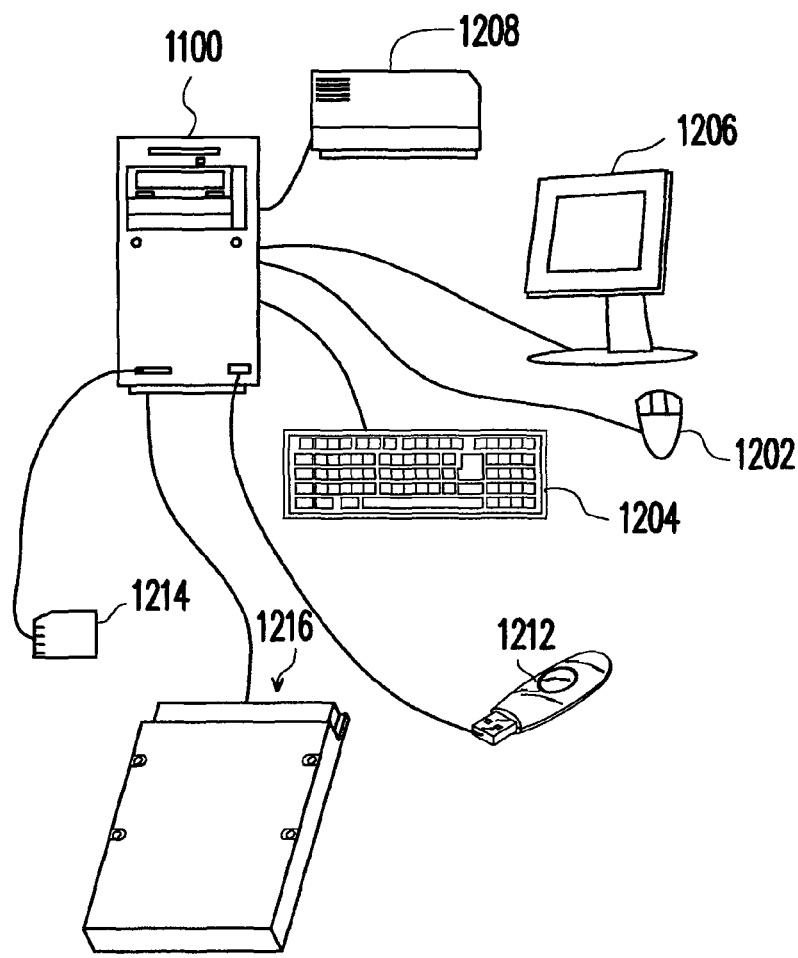
FIG. 1B is a schematic diagram illustrating a computer, an input/output device and a flash memory storage device according to an exemplary embodiment of the present invention.

The host system 1000 includes a computer 1100 and an input/output (I/O) device 1106. The computer 1100 includes a microprocessor 1102, a random access memory (RAM) 1104, a system bus 1108 and a data transmission interface 1110. The I/O device 1106 includes a mouse 1202, a keyboard 1204, a display 1206 and a printer 1208 shown in FIG. 1B. It should be noticed that the devices shown in FIG. 1B are not used to limit the I/O device 1106, and the I/O device 1106 may further include other devices.

In the present exemplary embodiment, the flash memory storage device 100 is coupled to the devices within the host system 1000 through the data transmission interface 1110. The host system 1000 may program data into or read data from the flash memory storage device 100 through processing of the microprocessor 1102, the RAM 1104 and the I/O device 1106. For example, the flash memory storage device 100 can be a memory card 1214, a flash drive 1212 or a solid state drive (SSD) 1216 shown in FIG. 1B.

Figure 1C:
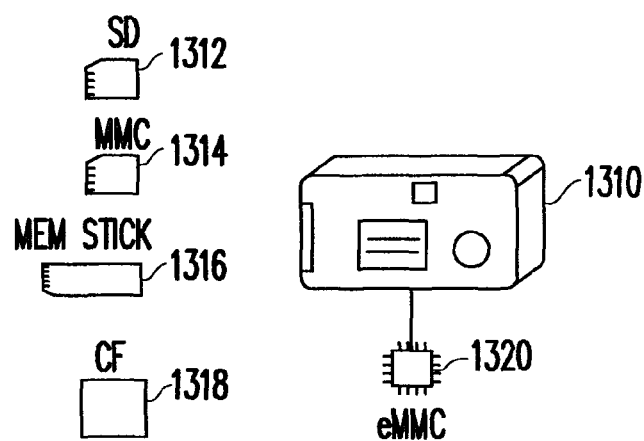
FIG. 1C is a schematic diagram illustrating a host system and a flash memory storage device according to another exemplary embodiment of the present invention.

Generally, the host system 100 can be any system capable of storing data, though in the present exemplary embodiment, the host system 1000 is assumed to be a computer system for description. However, in another exemplary embodiment of the present invention, the host system 1000 can also be a digital camera, a video camera, a communication device, an audio player or a video player, etc. For example, if the host system is a digital camera 1310, the flash memory storage device may be a secure digital (SD) card 1312, a multimedia card (MMC) 1314, a memory stick 1316, a compact flash (CF) card 1318 or an embedded storage device 1320 (shown in FIG. 1C). The embedded storage device 1320 includes an embedded MMC (eMMC). It should be noticed that the eMMC is directly coupled to a substrate of the host system.

Figure 1D:
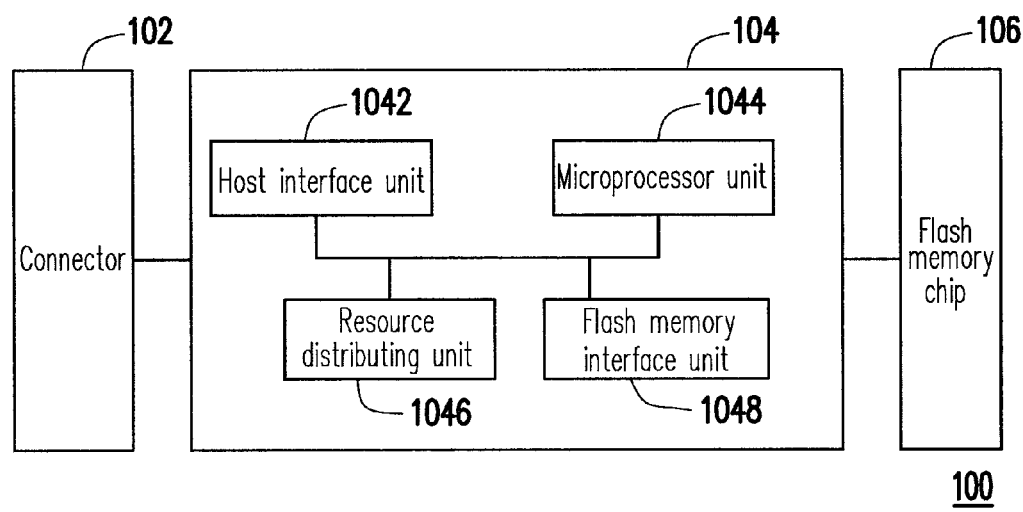
FIG. 1D is a schematic block diagram illustrating a flash memory storage device of FIG. 1A.

FIG. 1D is a schematic block diagram illustrating the flash memory storage device 100 of FIG. 1A. Referring to FIG. 1D, the flash memory storage device 100 includes a connector 102, a flash memory controller 104 and a flash memory chip 106.

The connector 102 is coupled to the flash memory controller 104, and is used for coupling to the host system 1000. In the present exemplary embodiment, a type of a transmission interface supported by the connector 102 is an SD interface. However, in the other exemplary embodiments, the transmission interface of the connector 102 may also be any suitable interfaces such as a multimedia card (MMC) interface, a serial advanced technology attachment (SATA) interface, a parallel advanced technology attachment (PATA) interface, an institute of electrical and electronic engineers (IEEE) 1394 interface, a peripheral component interconnect express (PCI express) interface, a universal serial buss (USB) interface, a memory stick (MS) interface, a compact flash (CF) interface, or an integrated drive electronics (IDE) interface, etc., which is not limited by the present invention.

The flash memory chip 106 is used for storing system information such as a file allocation table (FAT) and a new technology file system (NTFS), etc., and storing general data such as audio/video files and text files, etc.

The flash memory controller 104 may execute a plurality of logic gates or control commands to be implemented by hardware or firmware, and may perform a program operation, a read operation or an erase operation to the flash memory chip 106 according to operation commands of the host system 1000. The flash memory controller 104 includes a host interface unit 1042, a microprocessor unit 1044, a resource distributing unit 1046 and a flash memory interface unit 1048.

The host interface unit 1042 is used for coupling to the host system 1000 through the connector 102. In the present exemplary embodiment, the host interface unit 1042 has an SD interface, and in the other exemplary embodiments, the host interface unit 1042 may also be an interface unit complying with an MMC interface, an SATA interface, a PATA interface, an IEEE 1394 interface, a PCI express interface, a
USB interface, an MS interface, a CF interface, an IDE interface or other interface standards.

The flash memory interface unit 1048 is used for coupling the flash memory controller 104 to the flash memory chip 106, so that the flash memory controller 104 can perform related operations to the flash memory chip 106.

As shown in FIG. 1D, the host interface unit 1042, the resource distributing unit 1046 and the flash memory interface unit 1048 are all coupled to the microprocessor unit 1044, and the microprocessor unit 1044 is a main control unit of the flash memory controller 104, which is used for collaborating with the host interface unit 1042, the flash memory interface unit 1048 and the resource distributing unit 1046, etc. to perform various operations to the flash memory chip 106.

The resource distributing unit 1046 is used for distributing a control right of accessing the flash memory chip 106 when the flash memory storage device 100 is coupled to the host system 1000. A detailed operation manner of the resource distributing unit 1045 is described below.

In the present exemplary embodiment, the resource distributing unit 1046 is, for example, a real time operating system (RTOS). In another exemplary embodiment, the resource distributing unit 1046 may also to be implemented in the flash memory controller 104 through firmware. For example, the resource distributing unit 1046 including a plurality of control instructions is programmed into a program memory (for example, a read only memory (ROM)), and the program memory is embedded in the flash memory controller 104. During the operation of the flash memory storage device 100, the microprocessor unit 1044 executes the control instructions of the resource distributing unit 1046 to distribute the control right of accessing the flash memory chip 106.

Figure 2:
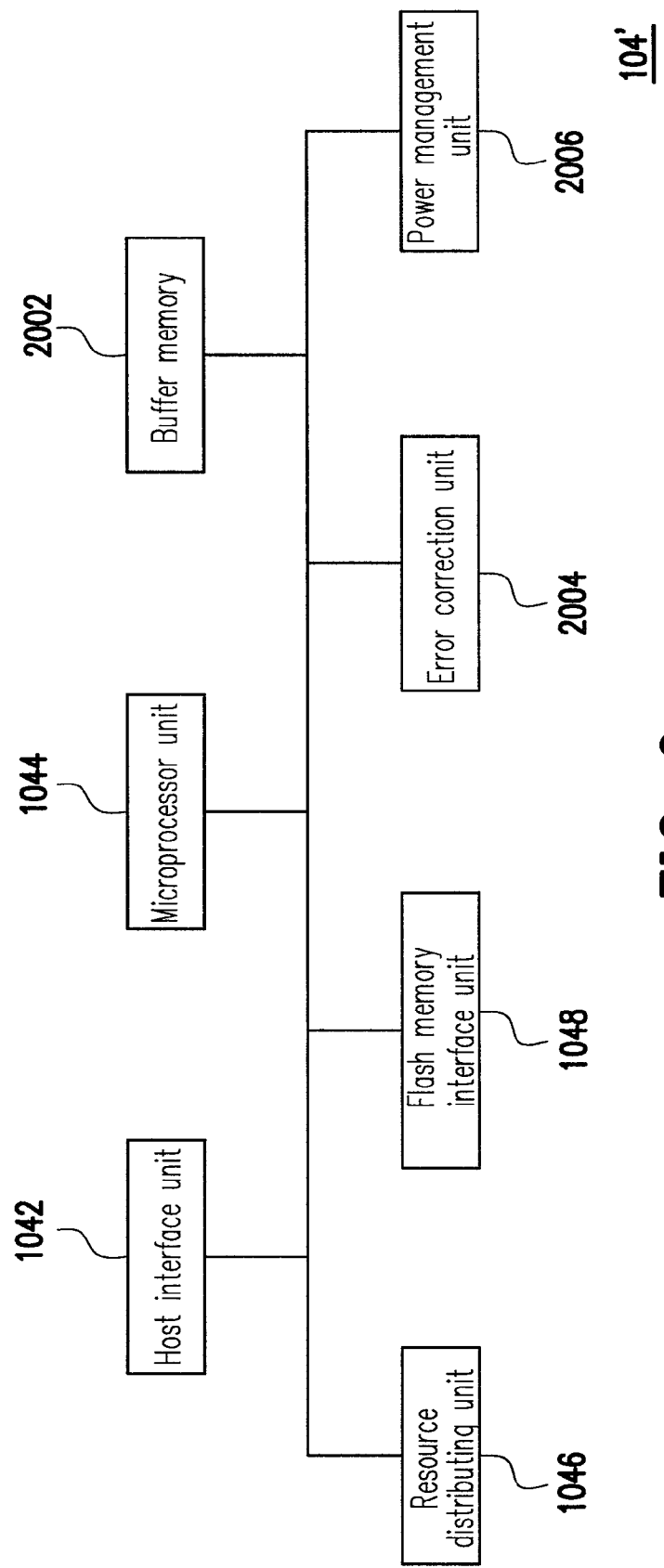
FIG. 2 is a block diagram illustrating a flash memory controller according to another exemplary embodiment of the present invention.

In another exemplary embodiment of the present invention, the flash memory controller of the flash memory storage device 100 further includes other function modules. FIG. 2 is a block diagram illustrating a flash memory controller according to another exemplary embodiment of the present invention. Referring to FIG. 2, besides the host interface unit 1042, the microprocessor unit 1044, the resource distributing unit 1046 and the flash memory interface unit 1048, the flash memory controller 104' further includes a buffer memory 2002, an error correction unit 2004, and a power management unit 2006.

In detail, the buffer memory 2002 is coupled to the microprocessor unit 1044, and is used for temporarily storing data from the host system 1000, or temporarily storing data from the flash memory chip 106.

The error correction unit 2004 is coupled to the microprocessor unit 1044, and is used for executing an error correction procedure to ensure correctness of data.

In detail, when the flash memory controller 104' receives a write command from the host system 1000, the error correction unit 2004 generates a corresponding error correction code (ECC) for the program data corresponding to the write command, and the program data and the corresponding ECC are altogether programmed to the flash memory chip 106. When the flash memory controller 104' receives a read command from the host system 1000, the flash memory controller 104' reads data corresponding to the read command and the ECC thereof from the flash memory chip 106. Now, the error correction unit 2004 executes the error correction procedure to the read data according to the ECC.

The power management unit 2006 is coupled to the microprocessor unit 1044, and is used for controlling a power supply of the flash memory storage device 100.

Figure 3:
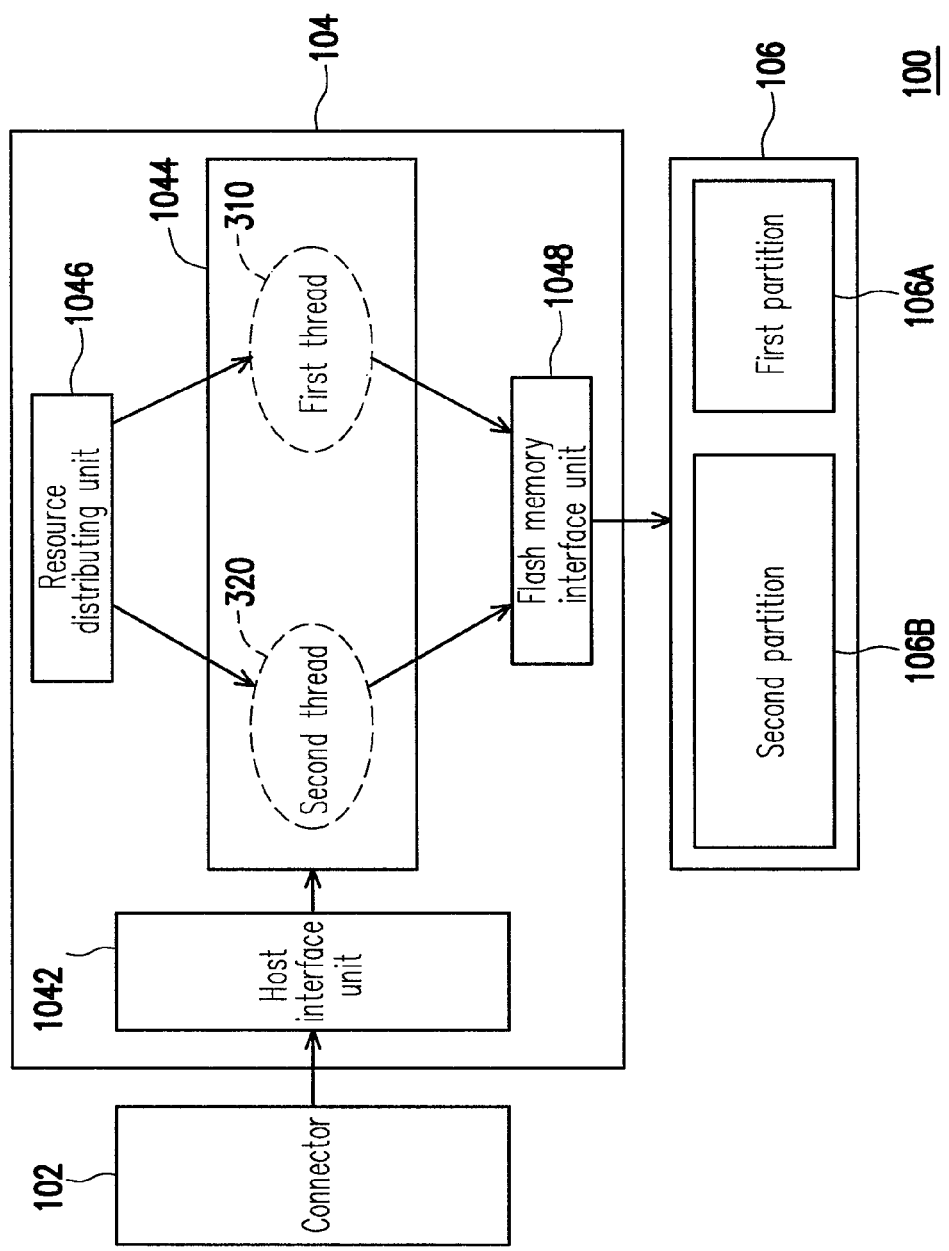
FIG. 3 is a schematic diagram illustrating operations of a flash memory storage device of FIG. 1A.

In the present exemplary embodiment, at least a first thread and a second thread are to be implemented within the flash memory storage device 100 (for example, a first thread 310 and a second thread 320 shown in FIG. 3). Namely, the memory storage device 100 applies a multi-thread structure. The first thread 310 and the second thread 320 may all access the flash memory chip 106 through the flash memory interface unit 1048. For example, the flash memory chip 106 of the present exemplary embodiment is at least divided into a first partition 106A and a second partition 106B, wherein the first thread 310 is in charge of managing the first partition 106A, and the second thread 320 is in charge of managing the second partition 106B, and a partition can only be accessed by the thread managing this partition. It should be noticed that the first thread 310 and the second thread 320 respectively have different flash memory management rules, so that after the write command sent from the host system 1000 is received, the conversion rules between logic blocks and physical blocks used by the first thread 310 and the second thread 320 may also be different.

Since both of the first thread 310 and the second thread 320 have to access the flash memory chip 106 through the flash memory interface unit 1048, the resource distributing unit 1046 has to manage and distribute the control right of the flash memory chip 106, so as to ensure that the first thread 310 and the second thread 320 all have chances to access the flash memory chip 106.

In the present exemplary embodiment, the resource distributing unit 1046 defines a predetermined program unit, wherein a number of physical pages included in the predetermined program unit are less than a number of physical pages included in a physical block of the flash memory chip 106. For example, the predetermined program unit may be one physical page. In case that the first thread 310 has obtained the control right of the flash memory chip 106, the resource distributing unit 1046 determines a next thread who obtains the control right of the flash memory chip 106 each time after the first thread 310 completes a data program operation of the predetermined program unit.

In detail, after the host interface unit 1042 receives the first write command from the host system 1000, the microprocessor unit 1044 determines the thread that is in charge of executing the first write command according to a type and/or a content of the first write command or a logic address of data to be programmed. When it is determined that the first thread 310 is in charge of executing the first write command, the microprocessor unit 1044 transmits the first write command to the first thread 310, and meanwhile the resource distributing unit 1046 distributes the control right of the flash memory chip 106 to the first thread 310. Now, the first thread 310 programs data into the first partition 106A of the flash memory chip 106 through the flash memory interface unit 1048. However, regardless whether a first program data corresponding to the first write command is entirely programmed into the flash memory chip 106, once the first thread 310 completes the data program operation of the predetermined program unit, the resource distributing unit 1046 controls the first thread 310 to release the control right of the flash memory chip 106.

Then, the resource distributing unit 1046 determines whether or not to distribute the control right of the flash memory chip 106 to the second thread 320, or again distribute the control right of the flash memory chip 106 to the first thread 310.

During a period that the first thread 310 executes the data program operation of the predetermined program unit, if the host interface unit 1042 receives a second write command from the host system 1000 that is required to be executed by the second thread 320, the resource distributing unit 1046 distributes the control right of the flash memory chip 106 to the second thread 320 after the first thread 310 releases the control right of the flash memory chip 106. Now, the second thread 320 programs data into the second partition 106B of the flash memory chip 106 through the flash memory interface unit 1048. After the second thread 320 programs a second program data corresponding to the second write command into the flash memory chip 106 completely, the resource distributing unit 1046 controls the second thread 320 to release the control right of the flash memory chip 106. Thereafter, if it is determined that the first thread 310 has not yet completed the program operation of the first program data corresponding to the first write command, the resource distributing unit 1046 again distributes the control right of the flash memory chip 106 to the first thread 310. Similarly, once the first thread 310 completes the data program operation of the predetermined program unit, the resource distributing unit 1046 controls the first thread to release the control right of the flash memory chip 106.

During the period that the first thread 310 executes the data program operation of the predetermined program unit, if the host interface unit 1042 does not receive another write command form the host system 1000, the resource distributing unit 1046 determines whether the first thread 310 has completed the program operation of the first program data corresponding to the first write command after the first thread 310 releases the control right of the flash memory chip 106. If not, the resource distributing unit 1046 again distributes the control right of the flash memory chip 106 to the first thread 310. After the first thread 310 completes the data program operation of the predetermined program unit, the resource distributing unit 1046 controls the first thread 310 to release the control right of the flash memory chip 106.

As described above, each time the first thread 310 can only program data with a size complied with that of the predetermined program unit, and then the first thread 310 releases the control right of the flash memory chip 106, and the resource distributing unit 1046 determines a next thread capable of accessing the flash memory chip 106. During the period that the first thread 310 executes the data program operation of the predetermined program unit, if the flash memory storage device 100 receives another write command from the host system 1000, and such write command is required to be executed by the second thread 320, since the second thread 320 has higher priority of accessing the flash memory chip 106, even if the first thread 310 has not yet completed the program operation of the received write command (i.e. both of the first thread 310 and the second thread 320 have to program data into the flash memory chip 106 at this time), the resource distributing unit 1046 still distributes the control right of the flash memory chip 106 to the second thread 320.

Since the program operation of the first thread 310 can be interrupted by the second thread 320, before the write command executed by the first thread 310 is completed, at least two physical blocks are required to record data in processing.

In detail, assuming the predetermined program unit is one physical page, after the first write command required to be executed by the first thread 310 is received, if the first write command is about to program a physical block A, in which physical pages A(0) to A(2) in the physical block A are stored with data, and the first write command is intended to update a content of the physical page A(2), after the first thread 310 obtains the control right of the flash memory chip 106, as shown in FIG. 4A, a new physical block B is required to be extracted from a spare area of the flash memory chip 106, and data stored in the physical page A(0) is programmed into a physical page B(0) of the physical block B, and then the first thread 310 releases the control right of the flash memory chip 106.

During a period that the first thread 310 programs data stored in the physical page A(0) into the physical page B(0), if the flash memory storage device 100 does not receive another write command form the host system 1000, since the program operation of the first write command is not completed, the resource distributing unit 1046 again distributes the control right of the flash memory chip 106 to the first thread 310. Then, as shown in FIG. 4B, the first thread 310 programs data stored in the physical page A(1) into a physical page B(1) of the physical block B, and then releases the control right of the flash memory chip 106.

During a period that the first thread 310 programs data stored in the physical page A(1) into the physical page B(1), if the flash memory storage device 100 receives the second write command required to be executed by the second thread 320, after the first thread 310 releases the control right of the flash memory chip 106, the control right of the flash memory chip 106 is distributed to the second thread 320. After the second thread 320 completes the second write command, the resource distributing unit 1046 controls the second thread 320 to release the control right of the flash memory chip 106.

Figure 4C:
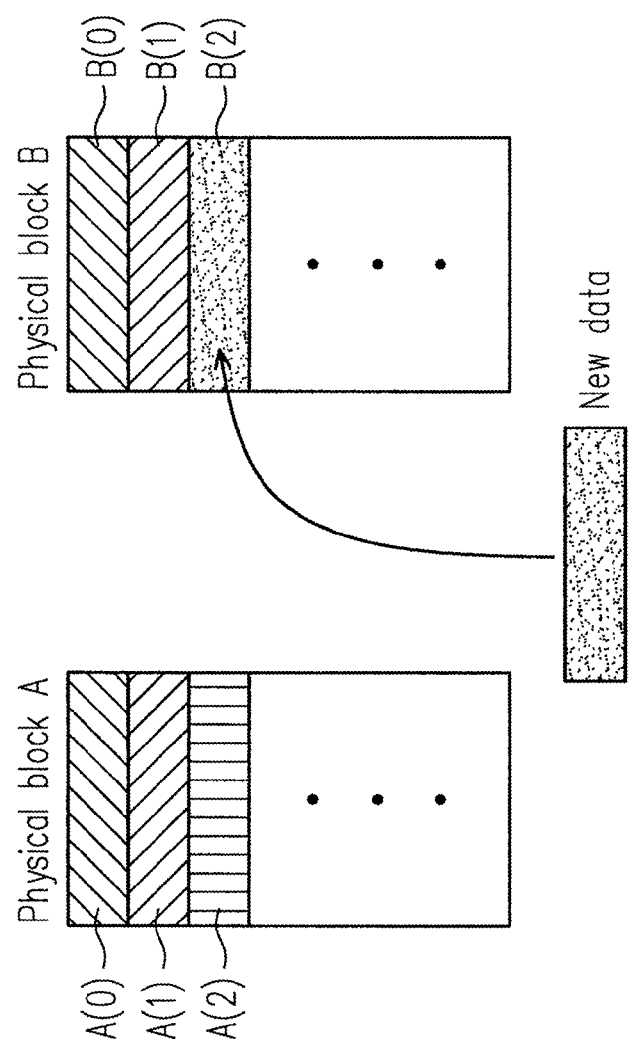

Now, since the first write command is not yet completed, the resource distributing unit 1046 again distributes the control right of the flash memory chip 106 to the first thread 310. As shown in FIG. 4C, after the first thread 310 programs the new data to be updated into a physical page B(2) of the physical block B, the first write command is completed. Since each time the first thread 310 can only execute the program operation of one physical page, the old data in the physical block A can be erased only after the first write command is completed, and then the physical block A is logically associated to the spare area.

Moreover, in another exemplary embodiment, once the microprocessor unit 1044 transmits an operation command (for example, a write, read or erase command) required to be executed by the first thread 310 to the first thread 310, regardless whether or not the operation command is completed, when the host system 1000 sends an inquiry, the flash memory controller 104 responses the host system 1000 an acknowledgement message of receiving the operation command, and none other acknowledgement message is generated when the first thread 310 completes the operation command. However, regarding an operation command (for example, a write, read or erase command) required to be executed by the second thread 320, only after the second thread 320 completes the operation command (for example, completes a data program operation of a write command), and after the host system 1000 sends an inquiry, the flash memory controller 104 responses the host system 1000 the acknowledgement message of completing the operation command.

Moreover, in still another exemplary embodiment, after receiving an operation command, the first or the second thread may actively response the host system 1000 an acknowledgement message of receiving the operation command, and after the operation command is completed, the first or the second thread may actively response the host system 1000 an acknowledgement message of completing the operation command.

Figure 5:
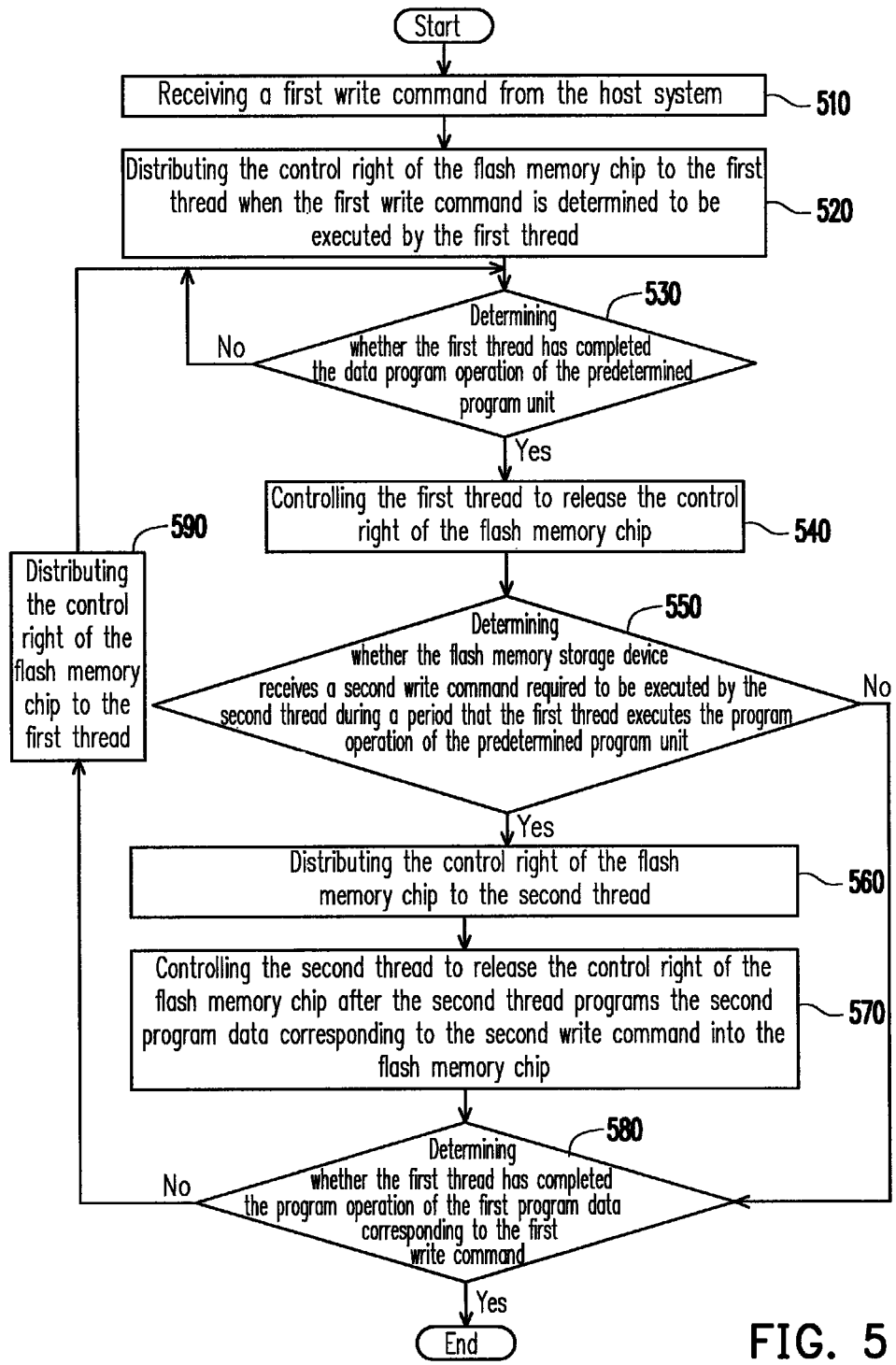
FIG. 5 is a flowchart of a program management method of a flash memory according to an exemplary embodiment of the present invention.

FIG. 5 is a flowchart of a program management method of a flash memory according to an exemplary embodiment of the present invention.

Referring to FIG. 5, in step 510, the flash memory storage device 100 receives a first write command from the host system 1000. In step 520, if the first write command is determined to be executed by the first thread 310, the resource distributing unit 1046 of the flash memory controller 104 distributes the control right of the flash memory chip 106 to the first thread 310.

In step 530, the resource distributing unit 1046 determines whether the first thread 310 has completed the data program operation of the predetermined program unit. If yes, in step 540, the resource distributing unit 1046 controls the first thread 310 to release the control right of the flash memory chip 106.

Next, in step 550, the resource distributing unit 1046 determines whether the flash memory storage device 100 receives a second write command sent by the host system 1000 that is required to be executed by the second thread 320 during a period that the first thread 310 executes the program operation of the predetermined program unit.

During the period that the first thread executes the program operation of the predetermined program unit, if the flash memory storage device 100 does not receive the second write command required to be executed by the second thread 320, a step 580 is executed.

During the period that the first thread executes the program operation of the predetermined program unit, if the flash memory storage device 100 receives the second write command required to be executed by the second thread 320, in step 560, the resource distributing unit 1046 distributes the control right of the flash memory chip 106 to the second thread 320, and in step 570, after the second thread 320 programs the second program data corresponding to the second write command into the flash memory chip 106, the resource distributing unit 1046 controls the second thread 320 to release the control right of the flash memory chip 106, and then the step 580 is executed.

In the step 580, the resource distributing unit 1046 determines whether the first thread 310 has completed the program operation of the first program data corresponding to the first write command. If yes, the program management method of the flash memory is completed, and if not, in step 590, the resource distribution unit 1046 distributes the control right of the flash memory chip 106 to the first thread 310. Next, the program management method of the flash memory goes back to the step 530, and the steps 530-590 are repeated until the first thread 310 completes the first write command.

Figure 6:
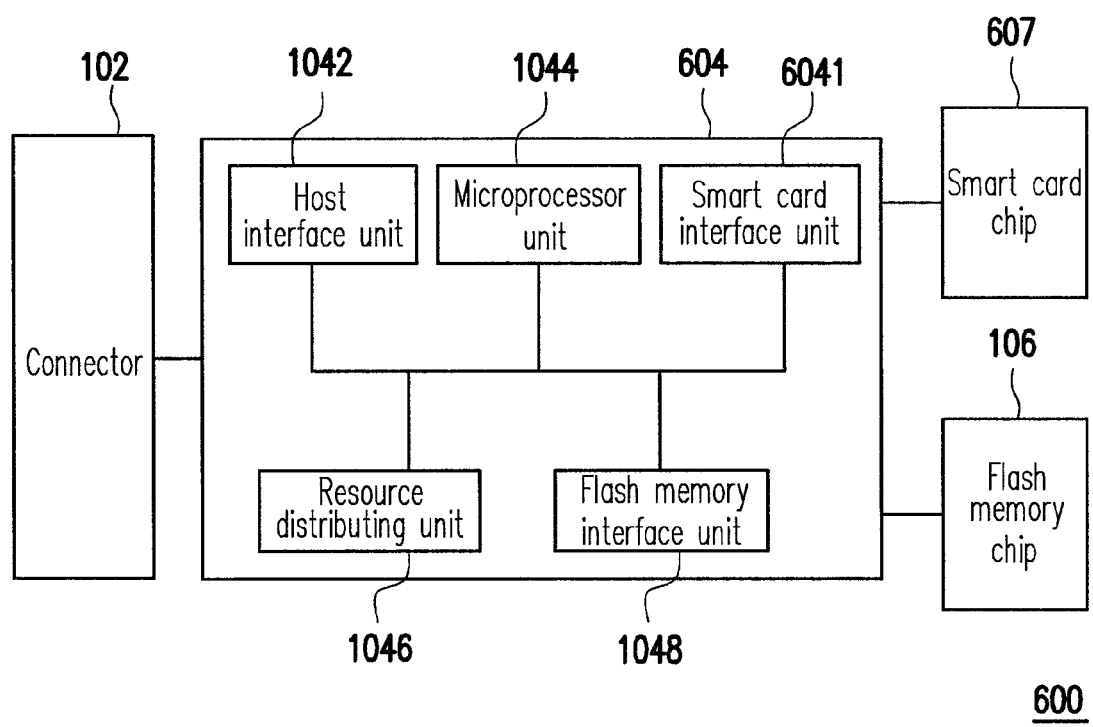
FIG. 6 is a schematic block diagram illustrating a flash memory storage device according to another exemplary embodiment of the present invention.

FIG. 6 is a schematic block diagram illustrating a flash memory storage device according to another exemplary embodiment of the present invention. Referring to FIG. 6, the flash memory storage device 600 is similar to the flash memory storage device 100 of FIG. 1D, and a difference there between is that besides the host interface unit 1042, the microprocessor unit 1044, the resource distributing unit 1046 and the flash memory interface unit 1048, the flash memory controller 604 of the flash memory storage device 600 further includes a smart card interface unit 6041. Moreover, besides coupling to the flash memory chip 106 through the flash memory interface unit 1048, the flash memory controller 604 is further coupled to a smart card chip 607 through the smart card interface unit 6041.

In the present exemplary embodiment, the smart card interface unit 6041 is complied with an international organization for standardization (ISO) 7816 specification. The flash memory storage device 600 at least has a first thread and a second thread to be implemented therein. In which, the first thread is used for executing application programs developed for specific purposes, for example, a smart card application program, and the second thread is used for executing a secure digital (SD) card read/write application program. Generally a data accessing amount of the smart card application program is less than that of the SD card read/write application program, and a data accessing speed of the smart card application program is relatively slow.

The smart card application program is used for communicating with the smart card chip 607, and is also used for accessing data in the flash memory chip 106. The SD card read/write application program is used for accessing data in the flash memory chip 106. Wherein, the SD card read/write application program has a higher priority of accessing the flash memory chip 106.

If the first write command received by the host interface unit 1042 is intended to update data in the flash memory chip 106, the microprocessor unit 1044 determines that the first write command is required to be executed by the smart card application program when the first write command is an application protocol data unit (APUD) command, and transmits the first write command to the smart card application program. The resource distributing unit 1046 also distributes the control right of the flash memory chip 106 to the smart card application program.

Each time the smart card application program can only execute a data program operation of the predetermined program unit (in the present exemplary embodiment, the predetermined program unit is assumed to be one physical page), and after the data program operation of the predetermined program unit is completed, the smart card application program has to release the control right of the flash memory chip 106. During a period that the smart card application program executes the data program operation of the predetermined program unit, if the host system 1000 sends a second write command required to be executed by the SD card read/write application program, the SD card read/write application program then obtains the control right of the flash memory chip 106. Since a detail operation method of the flash memory storage device 600 is similar to that of the flash memory storage device 100, detailed descriptions thereof are not repeated.

In the present exemplary embodiment, it is assumed that in the flash memory chip 106, each physical block includes 128 physical pages, and a size of each physical page is 4K bytes. Along with merging two physical blocks during execution of the write command, it takes about 150 ms to complete such write command, wherein an average time of reading and programming one page is about 1.15 ms.

Presently, according to an SD card specification, it is specified that time for completing each write command has to be less than 250 ms. In the present exemplary embodiment, since each time the smart card application program can only execute a data program operation of one physical page (i.e. merging of the physical blocks is completed in several executions), during a process when the smart card application program executes the data program operation, even if the flash memory storage device 600 receives the second write command required to be executed by the SD card read/write application program, and execution of the second write command requires to merge the physical blocks, the time for the SD card read/write application program completing the second write command does not exceed 250 ms defined by the SD card specification. In detail, the time for the SD card read/write application program completing the second write command is a sum of time for the smart cart application program executing the data program operation of one physical page and time for the SD card read/write application program programming the second program data corresponding to the second write command into the flash memory chip 106. Wherein, the time for the SD card read/write application program programming the second program data into the flash memory chip 106 does not exceed 150 ms.

It should be noticed that in the aforementioned exemplary embodiments, although the flash memory storage device having two threads is taken as an example for description, in the other exemplary embodiments of the present invention, the flash memory storage device may have more than two threads, and a type and an amount of the threads are not limited by the present invention.

In summary, the flash memory storage device, the controller thereof and the program management method thereof are adapted to the flash memory storage device having at least two threads. One of the specific threads is controlled to release the control right of the flash memory chip each time after completing the data program operation of the predetermined program unit, so that the other threads may have a chance of obtaining the control right of the flash memory chip, so as to reduce a time for waiting a specific thread to complete the program operation.

The previously described exemplary embodiments of the present invention have many advantages, including reducing a time for waiting a specific thread to complete the program operation. To be specific, the specific thread is controlled to release the control right of the flash memory chip each time after completing the data program operation of the predetermined program unit, so that the other thread may have a chance of obtaining the control right of the flash memory chip. The advantages aforementioned not required in all versions of the invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A program management method of a flash memory, adapted to a flash memory storage device comprising a flash memory controller and a flash memory chip, wherein at least a first thread and a second thread are to be implemented within the flash memory storage device, the method comprising:

defining a predetermined program unit by the flash memory controller;

receiving a first write command by the flash memory controller, wherein the first write command is corresponding to a first program data, wherein a quantity of the first program data is bigger than a quantity of the predetermined program unit, wherein the predetermined program unit includes at least one physical page;

distributing a control right of the flash memory chip to the first thread when the first write command is determined to be executed by the first thread by the flash memory controller;

controlling, by the flash memory controller, the first thread to release the control right of the flash memory chip each time in response to a completion of programming data into the predetermined program unit by the first thread;

determining, by the flash memory controller, whether the second thread requests the control right of the flash memory chip in response to the releasing of the control right of the flash memory by the first thread; and distributing the control right of the flash memory chip to the first thread if the second thread does not request the control right of the flash memory chip by the flash memory controller.

2. The program management method of the flash memory as claimed in claim 1, wherein after the step of distributing the control right of the flash memory chip to the first thread by the flash memory controller, the method further comprises:

distributing, by the flash memory controller, the control right of the flash memory chip to the second thread after the first thread releases the control right of the flash memory chip if a second write command required to be executed by the second thread is received during a period that the first thread executes the program operation of the predetermined program unit; and controlling, by the flash memory controller, the second thread to release the control right of the flash memory chip after the second thread programs a second program data corresponding to the second write command into the flash memory chip.

3. The program management method of the flash memory as claimed in claim 2, wherein after the step of controlling the second thread to release the control right of the flash memory chip by the flash memory controller, the method further comprises:

determining, by the flash memory controller, whether the first thread has completed the program operation of the first program data corresponding to the first write command;

distributing, by the flash memory controller, the control right of the flash memory chip to the first thread if the first thread does not complete the program operation of the first program data corresponding to the first write command; and controlling, by the flash memory controller, the first thread to release the control right of the flash memory chip after the first thread completes the program operation of the predetermined program unit.

4. The program management method of the flash memory as claimed in claim 1, wherein after the step of distributing the control right of the flash memory chip to the first thread by the flash memory controller, the method further comprises:

determining, by the flash memory controller, whether the first thread has completed the program operation of the first program data corresponding to the first write command after the first thread releases the control right of the flash memory chip if none other write command is received during a period that the first thread executes the program operation of the predetermined program unit;

distributing, by the flash memory controller, the control right of the flash memory chip to the first thread if the first thread does not complete the program operation of the first program data corresponding to the first write command; and controlling, by the flash memory controller, the first thread to release the control right of the flash memory chip after the first thread completes the program operation of the predetermined program unit.

5. The program management method of the flash memory as claimed in claim 1, wherein the first thread is used for executing a smart card application program, and the method further comprises:

determining, by the flash memory controller, that the first write command is required to be executed by the first thread if the first write command is an application protocol data unit (APDU) command.

6. The program management method of the flash memory as claimed in claim 1, wherein the second thread is used for executing a secure digital (SD) card read/write application program.

7. The program management method of the flash memory as claimed in claim 1, wherein a number of physical pages included in the predetermined program unit are less than a number of physical pages included in a physical block of the flash memory chip.

8. A flash memory storage device, wherein at least a first thread and a second thread are to be implemented within the flash memory storage device, the flash memory storage device comprising:
  a flash memory chip;
  a connector, coupled to a host, and transmitting write commands sent by the host; and
  a flash memory controller, coupled to the flash memory chip and the connector, for defining a predetermined program unit, wherein the predetermined program unit includes at least one physical page,
  wherein after the flash memory controller receives a first write command corresponding to a first program data sent by the host, and a quantity of the first program data is bigger than a quantity of the predetermined program unit, the flash memory controller distributes a control right of the flash memory chip to the first thread when determining that the first write command is required to be executed by the first thread, controls the first thread to release the control right of the flash memory chip each time in response to a completion of programming data into the predetermined program unit, determines whether the second thread requests the control right of the flash memory chip in response to the releasing of the control right of the flash memory chip, and distributes the control right of the flash memory chip to the first thread if the second thread does not request the control right of the flash memory chip.

9. The flash memory storage device as claimed in claim 8, wherein if the flash memory controller receives a second write command from the host that is required to be executed by the second thread during a period that the first thread executes the program operation of the predetermined program unit, the flash memory controller distributes the control right of the flash memory chip to the second thread after the first thread releases the control right of the flash memory chip, and controls the second thread to release the control right of the flash memory chip after the second thread programs a second program data corresponding to the second write command into the flash memory chip.

10. The flash memory storage device as claimed in claim 9, wherein after the second thread is controlled to release the control right of the flash memory chip, the flash memory controller determines whether the first thread has completed the program operation of the first program data,
  if the first thread does not complete the program operation of the first program data corresponding to the first write command, the flash memory controller distributes the control right of the flash memory chip to the first thread, and controls the first thread to release the control right of the flash memory chip after the first thread completes the program operation of the predetermined program unit.

11. The flash memory storage device as claimed in claim 8, wherein after the control right of the flash memory chip is distributed to the first thread, if the connector does not receive another write command sent by the host during a period that the first thread executes the program operation of the predetermined program unit, the flash memory controller determines whether the first thread has completed the program operation of the first program data corresponding to the first write command after the first thread releases the control right of the flash memory chip,
  if the first thread does not complete the program operation of the first program data, the flash memory controller distributes the control right of the flash memory chip to the first thread, and controls the first thread to release the control right of the flash memory chip after the first thread completes the program operation of the predetermined program unit.

12. The flash memory storage device as claimed in claim 8, wherein the first thread is used for executing a smart card application program, and the flash memory controller determines that the first write command is required to be executed by the first thread if the first write command is an application protocol data unit (APDU) command.

13. The flash memory storage device as claimed in claim 8, wherein the second thread is used for executing a secure digital (SD) card read/write application program.

14. The flash memory storage device as claimed in claim 8, wherein a number of physical pages included in the predetermined program unit are less than a number of physical pages included in a physical block of the flash memory chip.

15. A flash memory controller, disposed in a flash memory storage device coupled to a host, the flash memory storage device comprising a flash memory chip, and at least a first thread and a second thread are to be implemented within the flash memory storage device, and the flash memory controller comprising:
  a microprocessor unit;
  a flash memory interface unit, coupled to the microprocessor unit, for coupling to the flash memory chip;
  a host interface unit, coupled to the microprocessor unit, for coupling to the host; and
  a resource distributing unit, coupled to the microprocessor unit, for defining a predetermined program unit, wherein the predetermined program unit includes at least one physical page,
  wherein the host interface unit receives a first write command sent by the host, the first write command is corresponding to a first program data, and a quantity of the first program data is bigger than a quantity of the predetermined program unit,
  wherein when the microprocessor unit determines that the first write command is required to be executed by the first thread, the resource distributing unit distributes a control right of the flash memory chip to the first thread, controls the first thread to release the control right of the flash memory chip each time in response to a completion of programming data into the predetermined program unit, determines whether the second thread requests the control right of the flash memory chip in response to the releasing the control right of the flash memory chip, and distributes the control right of the flash memory chip to the first thread if the second thread does not request the control right of the flash memory chip.

* * * * *